US009192034B2

(12) United States Patent
Nakamura

(10) Patent No.: US 9,192,034 B2
(45) Date of Patent: Nov. 17, 2015

(54) DISCHARGE LAMP BALLAST, LIGHTING UNIT, AND VEHICLE

(75) Inventor: Toshiaki Nakamura, Kodama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 275 days.

(21) Appl. No.: 13/259,411

(22) PCT Filed: Mar. 18, 2010

(86) PCT No.: PCT/JP2010/054674
§ 371 (c)(1),
(2), (4) Date: Nov. 1, 2011

(87) PCT Pub. No.: WO2010/110170
PCT Pub. Date: Sep. 30, 2010

(65) Prior Publication Data

US 2012/0038276 A1 Feb. 16, 2012

(30) Foreign Application Priority Data

Mar. 26, 2009 (JP) ................................ 2009-077733

(51) Int. Cl.
*B60Q 1/00* (2006.01)
*H05B 41/288* (2006.01)
*H05B 41/38* (2006.01)

(52) U.S. Cl.
CPC ........ *H05B 41/2882* (2013.01); *H05B 41/2886* (2013.01); *H05B 41/386* (2013.01)

(58) Field of Classification Search
CPC .................................................. H05B 41/2886
USPC ........................................................ 315/212
See application file for complete search history.

(56) References Cited

U.S. PATENT DOCUMENTS 4,016,451 A * 4/1977 Engel ............................ 315/158
6,288,501 B1 * 9/2001 Nakamura et al. ............ 315/307
(Continued)

FOREIGN PATENT DOCUMENTS

CN 1703133 11/2005
JP 5-258879 10/1993
(Continued)

OTHER PUBLICATIONS

Search report from E.P.O., mail date is Apr. 3, 2013.
China Office action, mail date is Jul. 12, 2013 and an English language translation thereof.

*Primary Examiner* — Alexander H Taningco
*Assistant Examiner* — Christine Johnson
(74) *Attorney, Agent, or Firm* — Greenblum & Bernstein, P.L.C.

(57) ABSTRACT

A discharge lamp ballast includes a DC-DC converter circuit configured to convert a voltage of a DC power supply by a switching operation of a switching element based on a PWM signal and to output a DC power, an inverter circuit configured to invert the DC power into an AC power, and a PWM ON-width control circuit configured to control switching conditions of the switching element in the DC-DC converter circuit immediately before a polarity of the AC power is reversed such that an ON-width of the PWM signal is increased from a start of a polarity reversal so as to increase the DC power in a predetermined period. The polarity of the AC power of the inverter circuit is reversed in synchronism with a switching timing of the switching element immediately after the control by the PWM ON-width control circuit to increase the ON-width.

10 Claims, 11 Drawing Sheets

(56) References Cited

U.S. PATENT DOCUMENTS

| | | | | |
|---|---|---|---|---|
| 7,208,882 | B2 | 4/2007 | Ishizuka | |
| 2004/0251849 | A1* | 12/2004 | Harada et al. ............. | 315/209 R |
| 2005/0057181 | A1* | 3/2005 | Izumi et al. ............... | 315/209 R |
| 2005/0264237 | A1* | 12/2005 | Ishizuka ................... | 315/209 R |
| 2006/0087250 | A1* | 4/2006 | Fiorello ........................ | 315/212 |
| 2007/0164689 | A1 | 7/2007 | Suzuki | |

FOREIGN PATENT DOCUMENTS

| | | |
|---|---|---|
| JP | 8-222390 | 8/1996 |
| JP | 2003-133092 | 5/2003 |
| JP | 2005-340064 | 12/2005 |

* cited by examiner

DISCHARGE LAMP BALLAST, LIGHTING UNIT, AND VEHICLE

TECHNICAL FIELD

The present invention relates to a discharge lamp ballast configured to light a discharge lamp, a lighting unit lit by the discharge lamp ballast, and a vehicle equipped with the lighting unit.

BACKGROUND ART

Conventionally, there is a discharge lamp ballast configured to convert the an input DC power into an AC power and to light a high-intensity discharge lamp such as a HID lamp (High-intensity discharge lamp). In a related-art discharge lamp ballast 90 shown in FIG. 8, a DC-DC converter circuit 91 serving as a DC power converter circuit converts a DC voltage of a DC power supply PS into a DC power, and then an inverter circuit 92 converts the DC power into a low-frequency AC power and then supplies the output to a discharge lamp La via a starter circuit 93.

The DC-DC converter circuit 91 is of a fly-back converter system. The DC-DC converter circuit 91 controls the DC power supplied to the discharge lamp La acting as a load, by adjusting a PWM signal (Pulse Width Modulation signal) for driving a switching element Q0 connected in series to a primary winding of a transformer T.

The inverter circuit 92 has a full bridge configuration including switching elements Q1 to Q4. By alternately turning ON/OFF the paired switching elements Q1, Q4 and the paired switching elements Q2, Q3, the inverter circuit 92 converts the DC power fed from the DC-DC converter circuit 91 into a rectangular AC power.

In the starter circuit 93, a pulse driver circuit 931 provided on a primary side of a pulse transformer PT supplies a pulse current at a start time. Accordingly, a high voltage produced on a secondary side in accordance with a turn ratio of a coil is applied to the discharge lamp La, thereby starting an electric discharge of the discharge lamp La.

In the discharge lamp ballast 90 configured in this manner, the rectangular low-frequency AC power is supplied from the inverter circuit 92 to the discharge lamp La in order to avoid an acoustic resonance phenomenon and also to suppress electrode wear and a cataphoresis phenomenon. However, when the AC power is supplied, a lamp current passes through a zero point when a polarity of the AC power is reversed. Therefore, the electric discharge is stopped at the moment that the polarity of the lamp current is reversed.

In order to start the flow of electric current in the opposite direction after the lamp current is reversed from the zero, normally it is necessary to apply a predetermined high voltage called a reignition voltage to the discharge lamp La.

As shown in FIG. 9, when an output voltage Vo of the inverter circuit 92 is reversed, a lamp current Ila also starts to be reversed. Due to an inductance component (series inductance) Lp on the secondary side of the pulse transformer PT of the starter circuit 93, the lamp current Ila cannot change so sharply as the output voltage Vo, and is reversed to have a predetermined gradient dIla/dt.

The reignition voltage is increased as the gradient dIla/dt of the lamp current Ila at a time of polarity reversal is decreased. When the necessary reignition voltage is not supplied from the inverter circuit 92, a time Tzw (referred to as a "zero current period" hereinafter) in which the lamp current Ila becomes zero or is maintained to an electric current lower than an ordinary current occurs, as shown in FIG. 10. Thus, the noise may be generated, or the life of the discharge lamp La may be badly affected. Also, when the zero current period Tzw is extended much more, the flickering or the going-out of an illumination light is caused.

The zero current period Tzw caused at the polarity reversal of the lamp current Ila by decreasing the reignition voltage can be suppressed by reducing the inductance component Lp of the starter circuit 93 thereby increasing the gradient dIla/dt at the polarity reversal. However, there is a limit to the reduction of the inductance component Lp in terms of the starting performance.

For this reason, in the related-art discharge lamp ballast 90 shown in FIG. 8, by a method described below, an output of the DC-DC converter circuit 91 at the polarity reversal is increased, and thus the output voltage Vo of the inverter circuit 92 is increased, so that the necessary reignition voltage is maintained.

In the discharge lamp ballast 90, a dead time Td in which all switching elements Q1 to Q4 are turned OFF is set in order to prevent a short-circuited state of the circuit due to simultaneously ON state of the switching elements Q1, Q2 and Q3 and Q4 when the pair of switching elements Q1, Q4 and the pair of switching elements Q2, Q3 of the inverter circuit 92 are turned ON/OFF alternately. Therefore, a dead time adding circuit 941 is provided in an inverter driving signal generator circuit 94.

In the period of the dead time Td, a PWM signal generator circuit 96 is supplied not with a PWM command signal output from an error amplifier 953 of an output feedback control circuit 95 but with a predetermined command signal 981 for generating an output larger than the ordinary output. According to the command signal 981, as shown in FIG. 11, an output voltage V2 of the DC-DC converter circuit 91 is increased.

As a result, the output voltage Vo of the inverter circuit 92 is increased immediately after the start of the reversal whereby the necessary reignition voltage is maintained. Further, the gradient dIla/dt at the polarity reversal of the lamp current Ila can be increased by increasing the output voltage Vo (for example, see Patent Document 1).

In this method, when the polarity is reversed, a time Tt is shortened. The time Tt is from a time at which the lamp current Ila is in the polarity before the reversal of the lamp current Ila to a time at which the lamp current reaches zero. However, the DC-DC converter circuit 91 executes a power conversion based on the switching action, and thus the output of the DC-DC converter circuit 91 is not increased immediately after the PWM operating conditions (switching conditions) are changed. In particular, in the case of the DC-DC converter circuit 91, such as the fly-back converter, the step-up/down chopper, or the like, configured to accumulate an energy in the circuit elements when the ON condition of the switching element Q0 and then to discharge the accumulated energy to the load side when the OFF condition of the switching element Q0, the output voltage is increased stepwise every time of switching. As a result, the time Tt required until the lamp current Ila reaches zero is be shortened, and thus this time Tt comes close to a switching period Tsw of the DC-DC converter circuit 91 (for example, $Tt \leq 3 \cdot Tsw$).

At this time, the number of times of switching during the time Tt required until the lamp current Ila reaches zero may be decreased, and thus it may become difficult to obtain the output voltage Vo of the inverter circuit 92 which ensures the necessary reignition voltage.

The number of times of timings, i.e., OFF-timings, at which the output voltage Vo is increased during the time Tt required until the lamp current Ila reaches zero, is changed depending on the case where the reversing operation is started when the switching element Q0 of the DC-DC converter circuit 91 is turned ON or the case where the reversing operation is started when this switching element Q0 is turned OFF. In the former case, the output voltage Vo of the inverter circuit 92 in the zero current period Tzw, in which the lamp current Ila is maintained at zero, is decreased, and thus it may become difficult to ensure the necessary reignition voltage.

RELATED ART DOCUMENTS

Patent Documents

Patent Document 1: JP-A-08-222390

SUMMARY OF THE INVENTION

Problem to be Solved by the Invention

The present invention has been made in view of the above circumstances, and an object thereof is to ensure the necessary reignition voltage by increasing the output voltage of the inverter circuit even when the inductance value of the starter circuit is small and also when the time required until the lamp current reaches zero from the polarity prior to the reversal is close to the switching period of the DC-DC converter circuit.

Means for Solving the Problem

A discharge lamp ballast of the present invention, includes: a DC power supply; a DC-DC converter circuit configured to convert a voltage of the DC power supply by a switching operation of a switching element based on a PWM signal and to output a DC power; and an inverter circuit configured to invert the DC power into an AC power having a lower frequency than a switching frequency of the DC-DC converter circuit, thereby lighting a discharge lamp by the AC power of the inverter circuit, wherein the discharge lamp ballast further includes a PWM ON-width control circuit configured to control switching conditions of the switching element in the DC-DC converter circuit immediately before a polarity of the AC power is reversed such that an ON-width of the PWM signal is increased from a start of a polarity reversal so as to increase the DC power in a predetermined period, and wherein the polarity of the AC power of the inverter circuit is reversed in synchronism with a switching timing of the switching element immediately after the control by the PWM ON-width control circuit to increase the ON-width.

In the discharge lamp ballast of the present invention, the inverter circuit enters into a dead time in which switching elements of the inverter circuit are turned OFF, in synchronism with the switching timing of the switching element of the DC-DC converter circuit immediately after the control by the PWM ON-width control circuit to increase the ON-width of the PWM signal.

In the discharge lamp ballast of the present invention, the inverter circuit enters into the dead time immediately before the DC power increased by the control by the PWM ON-width control circuit to increase the ON width is output from the DC-DC converter circuit.

In the discharge lamp ballast of the present invention, the inverter circuit enters into the dead time with a delay of a predetermined time from the switching timing of the switching element immediately after the control by the PWM ON-width control circuit to increase the ON-width of the PWM signal.

The discharge lamp ballast of the present invention includes: an inductance component connected between an output terminal of the inverter circuit and the discharge lamp; and a capacitor connected to an input terminal, an output terminal, or both terminals of the inverter circuit, wherein a predetermined period for which the DC power is increased is set to ½ or less of a resonance period of a resonance circuit including the inductance component and the capacitor.

In the discharge lamp ballast of the present invention, the inductance component has a value such that a time until an electric current of the discharge lamp reaches zero from a start of an AC power reversal becomes larger than the switching period of the switching element in the predetermined period for which the DC power is increased.

In the discharge lamp ballast of the present invention, the switching operation of the switching element in the predetermined period for which the DC power is increased is executed by an open-loop control applied to the DC-DC converter circuit.

The discharge lamp ballast of the present invention includes a calculating circuit configured to calculate the switching conditions in the predetermined period for which the DC power is increased, based on a detection value of an input voltage, an output voltage, or both voltages of the DC-DC converter circuit.

A lighting unit of the present invention includes the above discharge lamp ballast.

A vehicle of the present invention is equipped with the above lighting unit.

Advantages of the Invention

According to the present invention, even when the inductance value of the starter circuit is small and also when the time required until the lamp current reaches zero from the polarity prior to the reversal is close to the switching period of the DC-DC converter circuit, the necessary reignition voltage can be ensured by increasing the output voltage of the inverter circuit.

MODE FOR CARRYING OUT THE INVENTION

A discharge lamp ballast, a lighting unit, and a vehicle according to embodiments of the present invention will be explained with reference to the drawings hereinafter. The discharge lamp ballast according to the embodiments of the present invention is used for lighting a HID lamp, or the like as a high-intensity discharge lamp.

Embodiment 1

Figure 1:
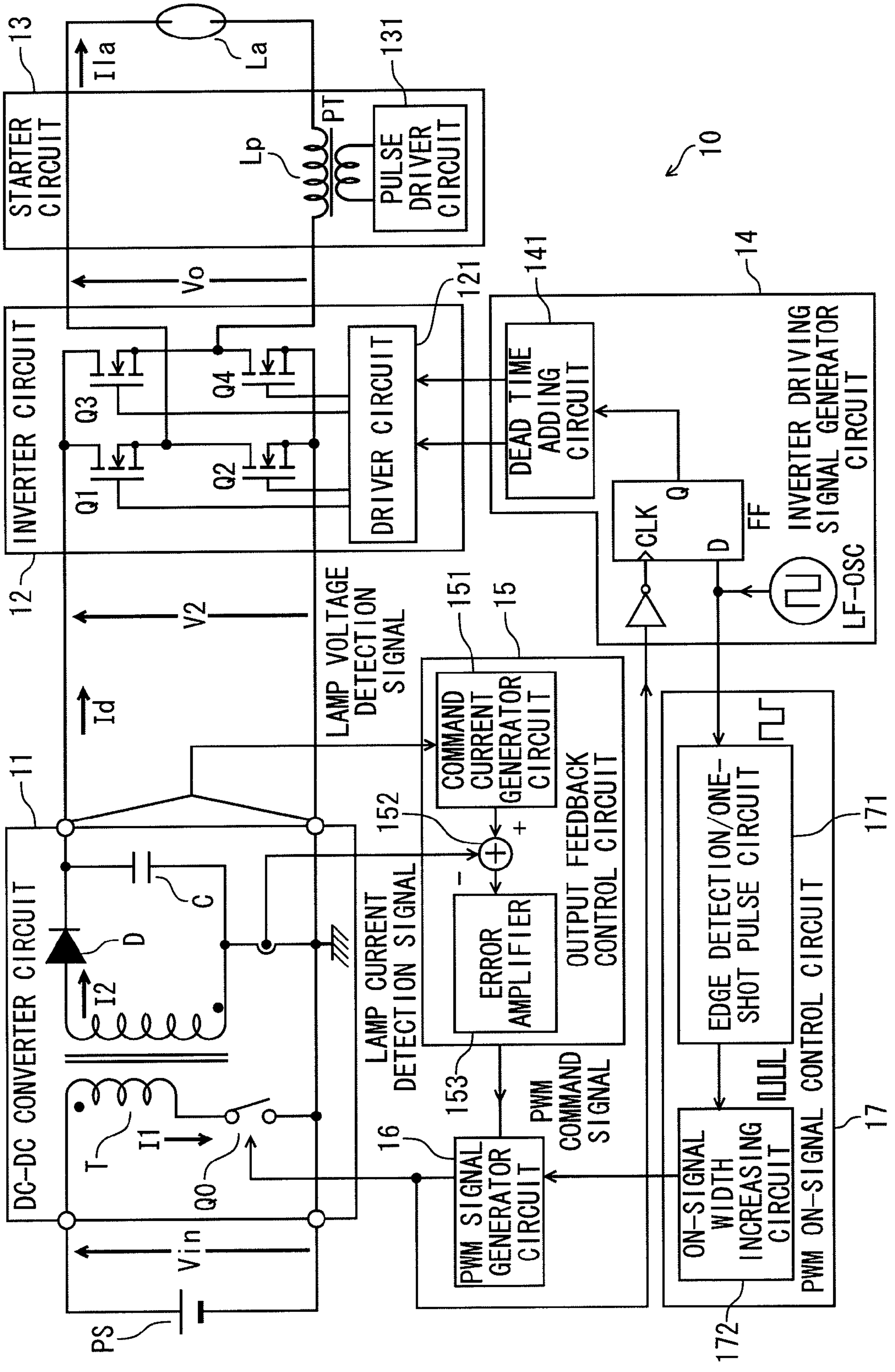
FIG. 1 is a schematic diagram of a discharge lamp ballast according to Embodiment 1 of the present invention.

FIG. 1 is a schematic diagram of a discharge lamp ballast according to Embodiment 1 of the present invention.

In FIG. 1, a discharge lamp ballast 10 of the present embodiment includes a DC-DC converter circuit 11, an inverter circuit 12, a starter circuit 13, an inverter driving signal generator circuit 14, an output feedback control circuit 15, a PWM signal generator circuit 16, and a PWM ON-signal control circuit 17.

The DC-DC converter circuit 11 is of the fly-back converter system, and includes a series circuit which includes a primary winding of a transformer T and a switching element Q0 and which is connected between both terminals of a DC power supply PS. In the DC-DC converter circuit 11, the switching element Q0 is turned ON/OFF in response to a PWM signal from the PWM signal generator circuit 16, so that an induced voltage in the secondary winding of the transformer T is rectified and smoothed by a diode D and a smoothing capacitor C, whereby a DC power having a desired output voltage V2 is output. Here, the DC-DC converter circuit 11 is not limited to the above configuration, and may use a step-up chopper, a step-down chopper, and a step-up/down chopper.

The inverter circuit 12 is an inverter circuit having a full bridge configuration including switching elements Q1 to Q4, and both connection points between the switching elements Q1, Q2 and between the switching elements Q3, Q4 are used as output terminals for the starter circuit 13. In response to a drive signal generated by the inverter driving signal generator circuit 14, the inverter circuit 12 causes a driver circuit 121 to turn ON/OFF the paired switching elements Q1, Q4 and the paired switching elements Q2, Q3. Accordingly, a DC power output from the DC-DC converter circuit 11 and having the output voltage V2 is converted into a rectangular AC power, and then the AC power is output. Here, the inverter circuit 12 is not limited to the above configuration, and may use a half bridge configuration or a configuration also equipped with the chopper function.

The starter circuit 13 includes: a pulse transformer PT having a secondary winding connected between the output terminals of the inverter circuit 12 via a discharge lamp La; and a pulse driver circuit 131 connected to a primary winding of the pulse transformer PT. This starter circuit 13 generates a high-voltage pulse between both terminals of the secondary winding by supplying a pulse current to the primary winding of the pulse transformer PT in a predetermined repetitive period by the pulse driver circuit 131, and then lights the discharge lamp La while using this high-voltage pulse as a kick voltage. Here, the starter circuit 13 is not limited to the above configuration, and may use an LC resonance voltage.

The inverter driving signal generator circuit 14 includes: a low-frequency oscillator circuit LF-OSC configured to perform an oscillating operation around a frequency (e.g., 400 Hz) at which the acoustic resonance is not caused; a flip-flop circuit FF; and a dead time adding circuit 141. This inverter driving signal generator circuit 14 receives the inverted signal of the PWM signal from the PWM signal generator circuit 16 at the clock input of the flip-flop circuit FF and receives the output signal of the low-frequency oscillator circuit LF-OSC at the D input, and outputs the signal synchronized with the OFF timing of the PWM signal from the Q output. The inverter driving signal generator circuit 14 sends this signal to the driver circuit 121 of the inverter circuit 12 via the dead time adding circuit 141. Accordingly, the dead time adding circuit 141 supplies a two-phase clock signal, to which a dead time in which all switching elements Q1 to Q4 are turned OFF is added, to the driver circuit 121.

The output feedback control circuit 15 includes a command current generator circuit 151, a subtracter 152, and an error amplifier 153. This output feedback control circuit 15 detects a voltage of the discharge lamp La equivalently by detecting the output voltage V2 of the DC-DC converter circuit 11, and calculates a command current value based on a power command value supplied to the discharge lamp La. Also, the output feedback control circuit 15 detects a current of the discharge lamp La equivalently by detecting the output current of the DC-DC converter circuit 11. Then, the output feedback control circuit 15 calculates a difference between the command current value and the current of the discharge lamp La, generates the PWM command signal by the error amplifier 153, and outputs this PWM command signal to the PWM signal generator circuit 16.

The PWM signal generator circuit 16 receives the PWM command signal output from the output feedback control circuit 15, generates the PWM signal and supplies the PWM signal to the switching element Q0. A duty ratio of the PWM signal can adjust the output voltage V2 of the DC-DC converter circuit 11 to a desired value.

The PWM ON-signal control circuit 17 serves as a PWM ON-width control circuit, and includes an edge detection/one-shot pulse circuit 171 and an ON-signal width increasing circuit 172. The PWM ON-signal control circuit 17 generates a pulse signal of a predetermined width by detecting a leading edge or a trailing edge of the signal sent from the low-frequency oscillator circuit LF-OSC. Then, the PWM ON-signal control circuit 17 provides an ON-width increasing signal for increasing the ON period of the switching element Q0 to the PWM signal generator circuit 16, such that an output of the DC-DC converter circuit 11 is increased during the period of the pulse width.

Figure 2:
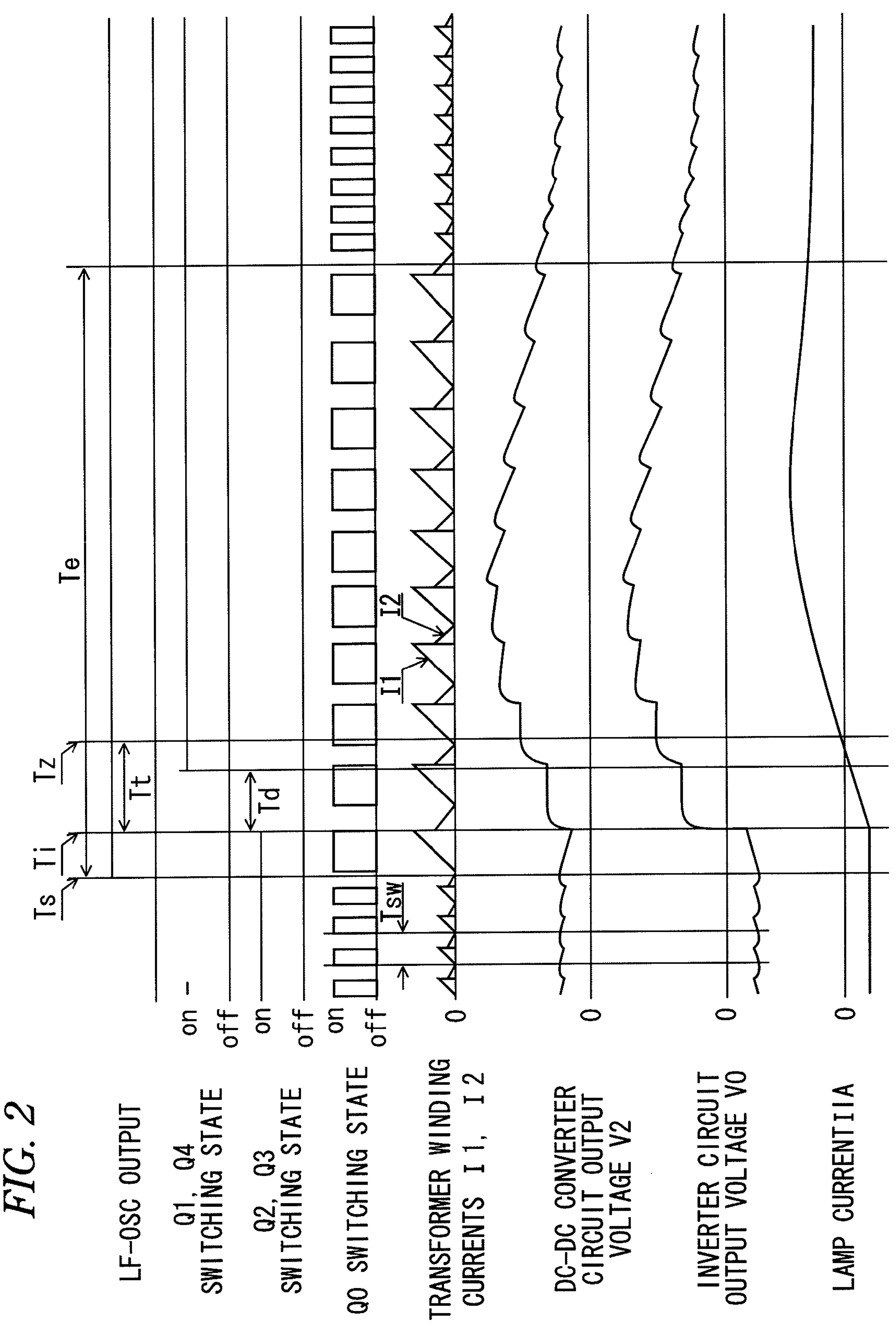
FIG. 2 is an operating waveform diagram explaining an operation of the discharge lamp ballast according to Embodiment 1 of the present invention.

Next, in the discharge lamp ballast 10 configured as described above, an operation at the reversal of the polarity of the output voltage Vo of the inverter circuit 12 will be explained hereunder. FIG. 2 is an operating waveform diagram explaining an operation of the discharge lamp ballast 10.

In the discharge lamp ballast 10 according to the present embodiment, the polarity reversal of the output voltage Vo is decided based on the signal of the low-frequency oscillator circuit LF-OSC.

The edge detection/one-shot pulse circuit 171 of the PWM ON-signal control circuit 17 detects a leading edge or a trailing edge at which the signal of the low-frequency oscillator circuit LF-OSC is reversed. Then, the edge detection/one-shot pulse circuit 171 generates a pulse signal as a one-shot pulse which has a pulse width Te during which the pulse signal is kept at a high level during a period Te as shown in FIG. 2. The pulse width Te of this pulse signal is referred to as an “output increasing period Te” hereinafter.

The ON-signal width increasing circuit 172 outputs the ON-width increasing signal to the PWM signal generator circuit 16 during the output increasing period Te to switch the operation so as to increase the ON time of the switching element Q0 up to a predetermined value, irrespective of the PWM command signal output from the output feedback control circuit 15. Accordingly, the PWM signal generator circuit 16 executes the open-loop control that is not subjected to the feedback control applied by the output feedback control circuit 15, and generates the PWM signal to increase the ON time of the switching element Q0 to the predetermined value.

In the output increasing period Te, an ON time and a period of the PWM signal generated by the PWM signal generator circuit 16 are adjusted by calculating the PWM operating conditions (switching conditions), which can ensure the electric power required when the inverter circuit 12 is inverted and do not exceed the limits of the circuit elements, based on an input voltage Vin or the output voltage V2 of the DC-DC converter circuit 11 or both voltage detection signals. The PWM signal generator circuit 16 includes a calculating circuit configured to calculate the above PWM operating conditions. Nevertheless, the PWM operating conditions may be calculated so as to correspond to a level of the detected signal by referring to a PWM constant table prepared in advance.

In the present embodiment, the DC-DC converter circuit 11 serving as the fly-back converter is operated in a current continuous critical mode (CCCM) as the switching mode. In this current continuous critical mode (CCCM), after the switching element Q0 is turned OFF, the switching element Q0 is turned ON once again when a secondary winding current I2 of the transformer T reaches almost zero. Accordingly, as shown in FIG. 2, the switching period in the output increasing period Te becomes larger than other periods.

In this case, the switching operation of the DC-DC converter circuit 11 is not limited to the CCCM. Any switching conditions may be employed, for example, the DC-DC converter circuit 11 may be operated in a current discontinuous mode in which the switching element Q0 is turned ON once again at any time of the period in which the secondary winding current I2 is zero, after the switching element Q0 is turned OFF may be operated in a current continuous mode in which the switching element Q0 is turned ON while the secondary winding current I2 is flowing, after the switching element Q0 may be operated at a fixed switching frequency, or the like.

Returning to FIG. 1, the PWM signal generator circuit 16 generates the PWM signal having widened ON-signal width when the ON-width increasing signal is input from the PWM ON-signal control circuit 17, and sends the PWM signal to the switching element Q0. In this moment, the inverter circuit 12 detects a time point of an OFF timing Ti of the first switching period in which the ON period of the switching element Q0 is increased, and the output voltage of the inverter circuit 12 starts the polarity reversing operation.

First, the inverter circuit 12 enters into a dead time Td in which all switching elements Q1 to Q4 are turned OFF. In FIG. 2, the switching elements Q2, Q3 having been in the ON state are turned OFF. At that time, a diode (not shown) is connected to the switching elements Q2, Q3 in inverse-parallel (when the switching elements are formed of the MOSFETs, a parasitic diode is employed). Hence, an energy accumulated in the inductance component Lp of the pulse transformer PT in the starter circuit 13 is regenerated on the output side of the DC-DC converter circuit 11 via the inverse-parallel connected diodes of the switching elements Q1, Q4, whereby the switching elements Q1, Q4 are set equivalently in their ON state. As a result, the polarity of the output voltage Vo of the inverter circuit 12 is reversed in a moment, and also an absolute value of the lamp current Ila starts to reduce.

Simultaneously, the switching element Q0 is switched into the OFF state, and the output voltage V2 of the DC-DC converter circuit 11 starts to increase. The DC-DC converter circuit 11 is driven in the CCCM mode. Therefore, when the secondary winding current I2 of the transformer T reaches almost zero, the switching element Q0 is turned ON once again and then the operation goes to the next switching period.

As soon as the predetermined dead time Td has elapsed, the switching elements Q1, Q4 are turned ON. In this case, it is necessary to set the dead time Td to a value smaller than a time Tt required until the lamp current Ila reaches zero.

In this manner, the output voltage V2 of the DC-DC converter circuit 11 rises gradually. When the output increasing period Te has elapsed ultimately, the PWM signal generator circuit 16 stops the ON-width increasing signal fed from the ON-signal width increasing circuit 172. Then, the operation of the PWM signal generator circuit 16 goes back to the feedback control of the output feedback control circuit 15, and is switched into an operation mode in which the PWM operating conditions in the PWM signal generator circuit 16 are decided by the PWM command signal.

The switching period of the switching element Q0 in the output increasing period Te is set shorter than at least a time required until the lamp current Ila reaches zero from a time point of the OFF timing Ti at which the reversing operation is started. Further, operation of causing the switching element Q0 to be transited from the ON state to the OFF state thereby discharging the energy accumulated in the transformer T to the secondary side is performed at least twice, until the lamp current Ila reaches the zero crossing. Accordingly, the output voltage V2 of the DC-DC converter circuit 11 at a time point at which the lamp current Ila is zero can be set as highly as possible.

As described above, when the polarity of the output voltage Vo of the inverter circuit 12 is reversed, the energy accumulated in the inductance component Lp of the starter circuit 13 is regenerated at the output end of the DC-DC converter circuit 11. Therefore, after the polarity reversal is started, the output of the DC-DC converter circuit 11 is not fed to the discharge lamp La serving as the load, and as a result the voltage can be increased effectively. From this aspect, the energy regenerated at the output end of the DC-DC converter circuit 11 from the starter circuit 13 also contributes an increase of the output voltage.

The lamp current Ila passes through a zero point, the regeneration of energy is terminated. Here, a part of the output voltage Vo of the inverter circuit 12 is divided to the inductance component Lp of the starter circuit 13 in a predetermined period from the reversal start. In this period, the output voltage Vo can be increased higher than the voltage to be applied to the discharge lamp La.

However, even though the output voltage Vo of the DC-DC converter circuit 11 is increased for an excessively long while, such voltage is consumed merely in the discharge lamp La, but the voltage applied to the discharge lamp La is not increased. For this reason, it is preferable that the output increasing period Te in which the output voltage Vo of the DC-DC converter circuit 11 can be increased effectively is set, as an upper limit, to ½ of a resonance period of the resonance circuit which includes: the inductance component Lp of the starter circuit 13 connected across the output ends of the inverter circuit 12; and the smoothing capacitor C connected across the output ends of the DC-DC converter circuit 11.

Also, it is preferable that, when a filtering capacitor is provided to the output end of the inverter circuit 12 and when a capacitor is provided to the input terminal of the starter circuit 13, the output increasing period Te is set, as an upper limit, to ½ of a resonance period of the resonance circuit which includes: a composite capacitance of these capacitors and the smoothing capacitor C; and the inductance component Lp of the starter circuit 13.

In the output increasing period Te, in place of the feedback control described above, the open-loop control of the PWM signal generator circuit 16 is executed such that the DC-DC converter circuit 11 is driven under the predetermined PWM operating conditions. Thus, the output in the open-loop control is increased larger than that in the feedback control. In this period, since the output feedback control circuit 15 always detects the excessive output, the PWM command signal acts to suppress the output. However, the PWM signal generator circuit 16 disregards the PWM command signal fed from the output feedback control circuit 15 for the output increasing period Te, and therefore the PWM command signal acts to suppress the output more and more. When the output increasing period Te is terminated in this commanded state, and the PWM signal sent from the PWM signal generator circuit 16 is switched to a PWM signal based on the PWM command signal output from the output feedback control circuit 15, the PWM signal generator circuit 16 immediately largely lowers the output of the DC-DC converter circuit 11, which causes, in the worst case, the discharge lamp La to be turned out.

In order to avoid this situation, it is preferable that the operation applied to the feedback control in the output feedback control circuit 15, etc. is stopped during the output increasing period Te. Also, this situation may be avoided by substantially stopping the calculation for the feedback control by setting detected values used for executing the feedback control into a hold state by means of a sample-and-hold circuit.

As explained above, according to the discharge lamp ballast 10 according to Embodiment 1 of the present invention, the PWM ON-signal control circuit 17 configured to control the PWM signal generator circuit 16 by the open loop is provided, the switching element Q0 of the DC-DC converter circuit 11 is driven by the PWM signal in which the ON width is increased when the polarity of the inverter circuit 12 is reversed, the polarity of the inverter circuit 12 is reversed in synchronism with the OFF time of the first PWM signal, and the output voltage of the DC-DC converter circuit 11 is increased by regenerating the energy from the inductance component Lp of the starter circuit 13. As a result, the output voltage of the inverter circuit 12 is increased to ensure the necessary reignition voltage, and the discharge lamp La can be lit stably.

In other words, according to the present invention, even though the inductance value of the starter circuit is small, and the time required until the lamp current reaches zero from the polarity prior to the reversal is close to the switching period of the DC-DC converter circuit, the output voltage of the inverter circuit can be increased and the necessary reignition voltage can be kept. Also, the output voltage of the DC-DC converter circuit can be increased during the dead time period, and the necessary reignition voltage can be ensured. Also, the predetermined period in which the DC power is increased is set to ½ or less of the resonance period of the resonance circuit which includes the inductance component of the starter circuit and the smoothing capacitor connected across the output ends of the DC-DC converter circuit. Accordingly, the output voltage of the DC-DC converter circuit can be increased effectively within the predetermined period, and also the necessary reignition voltage can be ensured quickly. Also, the inductance component is set to the value such that the time required until the electric current of the discharge lamp reaches zero from the reversal start of the AC power becomes larger than the switching period of the switching element in the predetermined period during which the DC power is increased. Also, the time required until the electric current of the discharge lamp reaches zero from the reversal start of the AC power is decided while setting the switching period of the switching element as the upper limit such that the time becomes smaller than the switching period of the switching element in the predetermined period during which the DC power is increased. Also, the switching operation of the switching element in the predetermined period during which the DC power is increased is executed by the open-loop control. According to these configurations, the output voltage of the DC-DC converter circuit can be increased effectively in the predetermined period, and also the necessary reignition voltage can be ensured quickly.

Here, in the present embodiment, the PWM ON-signal control circuit 17 applies the control to the PWM signal generator circuit 16 such that the ON time of the switching element Q0 is increased up to a predetermined value. However, the control is not limited to this mode. For example, a system in which the ON time of the switching element Q0 is increased up to a predetermined value by switching the level of the PWM command signal output from the output feedback control circuit 15 may be employed. Alternately, any method of switching the switching conditions of the DC-DC converter circuit 11 in a moment, e.g., the system for switching the command current generated by the output feedback control circuit 15, or the like may be employed.

The circuit configuration of the discharge lamp ballast 10 in the present embodiment is not limited to the above-described configuration, and other circuit configurations may be employed so long as such configurations can perform the similar operation. Further, a configuration that can accomplish the similar operation on software by using a microcomputer, or the like may be employed. For example, a circuit configuration in which a synchronizing operation of the polarity reversing timing in the inverter circuit is shifted to an interrupting process caused by the PWM signal thereby starting the reversing process may be employed.

Embodiment 2

Figure 3:
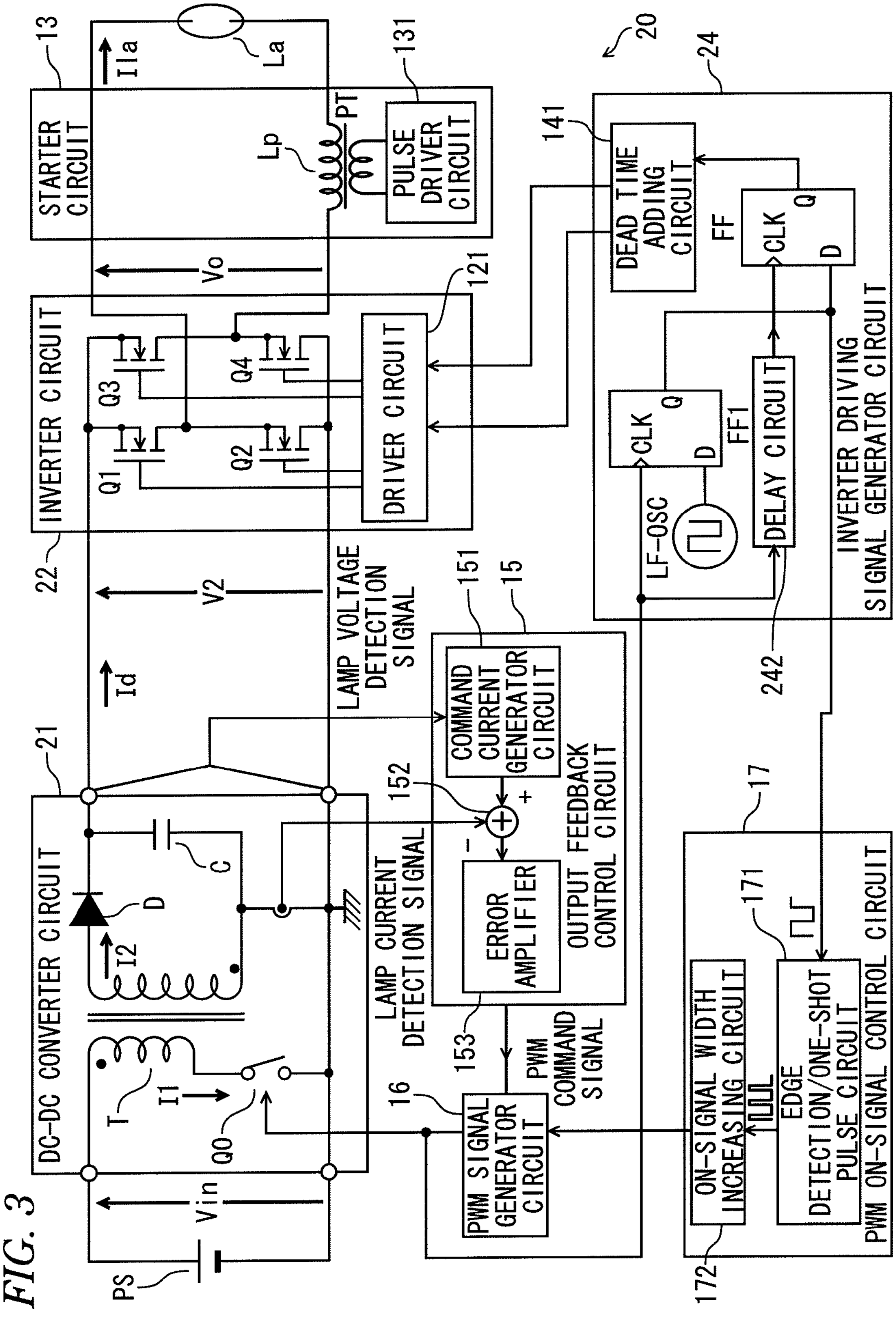
FIG. 3 is a schematic diagram of a discharge lamp ballast according to Embodiment 2 of the present invention.

FIG. 3 is a schematic diagram of a discharge lamp ballast according to Embodiment 2 of the present invention. In this case, the same reference symbols are appended to the constituent elements having the same functions as those in FIG. 1, and their explanation will be simplified or omitted herein.

In FIG. 3, a discharge lamp ballast 20 according to Embodiment 2 of the present invention includes a DC-DC converter circuit 21, an inverter circuit 22, the starter circuit 13, an inverter drive signal generator circuit 24, the output feedback control circuit 15, the PWM signal generator circuit 16, and the PWM ON-signal control circuit 17.

In the DC-DC converter circuit 21, the diode D is connected in an opposite direction as compared with the DC-DC converter circuit 11 of the discharge lamp ballast 10 of Embodiment 1 shown in FIG. 1, and accordingly the output voltage V2 is set at a negative potential with respect to the GND level.

The inverter circuit 22 includes the switching elements Q1 to Q4, and in accordance with the output polarity of the DC-DC converter circuit 21, the connection polarity of the switching elements Q1 to Q4 is opposite to the DC-DC converter circuit 11 in FIG. 1.

The inverter drive signal generator circuit 24 includes a flip-flop circuit FF1, and a delay circuit 242 configured to generate a delay time Ty described later, in addition to the inverter driving signal generator circuit 14 in FIG. 1.

The normal operations and functions of the discharge lamp ballast 20 configured as described above are similar to those in Embodiment 1 shown in FIG. 1.

The discharge lamp ballast 10 of Embodiment 1 is operated such that the reversing operation of the output polarity is started at the timing when the switching element Q0 of the DC-DC converter circuit 11 is turned OFF, and the energy accumulated in the transformer T is discharged to the secondary side immediately after the polarity reversal is started.

However, until the reversing operation is started after a timing of detecting the switching element Q0 of the DC-DC converter circuit 11 is turned OFF, a delay in signal propagation in the circuits, a delay of the switching operation, etc. occur. Due to these delays, a situation in which the transformer T starts discharging of its accumulated energy to the secondary side before the reversing operation is started may occur.

Further, a part of the energy discharged to the secondary side prior to the reversing operation contributes an increase of voltage across the smoothing capacitor C, but the remaining energy is consumed by the discharge lamp La serving as the load. Therefore, a contribution factor to the output voltage V2 of the DC-DC converter circuit 11 is reduced.

Figure 4:
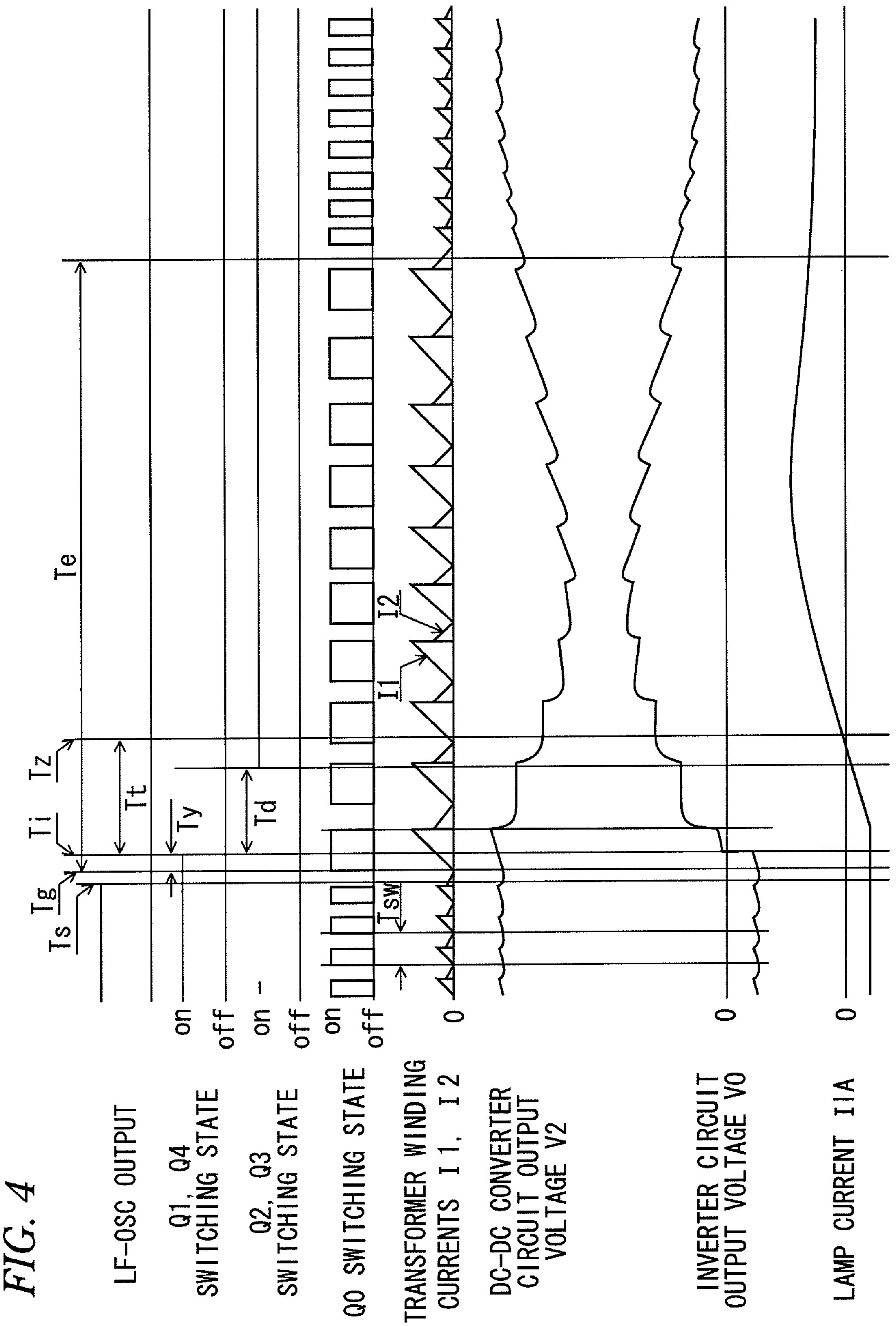
FIG. 4 is an operating waveform diagram explaining an operation of the discharge lamp ballast according to Embodiment 2 of the present invention.

In particular, when the DC-DC converter circuit 11 is of the fly-back converter system, the winding currents I1, I2 of the transformer T have a sawtooth waveform as shown in FIG. 4 and have a largest value immediately after the switching element Q0 is turned OFF and then are gradually decreased. That is, the energy fed to the output side is increased largest immediately after the switching element Q0 is turned OFF, and then is decreased in proportion to a square of time. Therefore, if the reversing operation of the inverter circuit 12 has not been started at a point of time when the switching element Q0 is turned OFF, the effect of increasing the output voltage V2 of the DC-DC converter circuit 11 is lessened.

Similar to the DC-DC converter circuit 11 of the fly-back converter system, such situation also occurs in the case of the system such as the step-up/down chopper, or the like in which the energy is accumulated in the circuit element under the ON condition of the switching element Q0 and the accumulated energy is discharged to the load side under the OFF condition.

In the present embodiment, at a time point Ts shown in FIG. 4, the operation mode is switched to a PWM operating conditions (switching conditions) which increases the output voltage of the DC-DC converter circuit 21. Then, the subsequent ON signal of the switching element Q0 is detected, the reversing operation of the inverter circuit 22 is started at a time point of the OFF timing Ti after the predetermined delay time Ty has elapsed from an ON timing Tg, and the dead time Td at which all switching elements Q1 to Q4 are turned OFF is started.

The delay time Ty is set shorter than the ON time of the switching element Q0 under the PWM operating conditions which increases the output voltage of the DC-DC converter circuit 21. Thus, the reversing operation can be started before the switching element Q0 is turned OFF.

Figure 5:
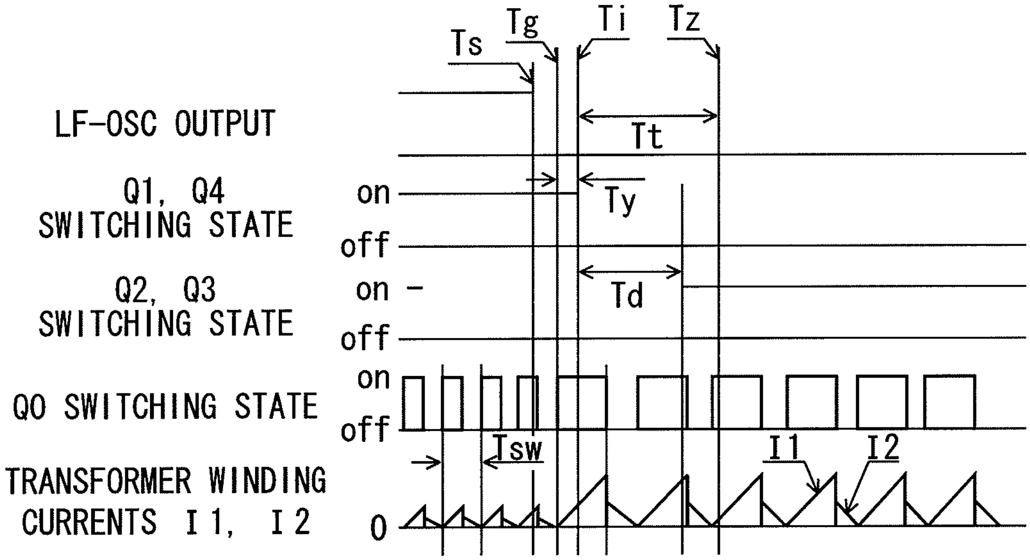
FIG. 5 is an operating waveform diagram explaining an operation of the discharge lamp ballast according to Embodiment 2 of the present invention.

Preferably, as shown in FIG. 5, when the switching element Q0 has already been turned ON at the time point Ts at which the output is switched, the PWM operating conditions is not switched to keep the switching conditions that have been applied, and the PWM operating conditions are switched at the subsequent ON timing Tg. This is because if a measuring starting time for the delay time is started from a time point Ts, a delay time from the ON time is prolonged longer than the delay time Ty, and therefore the switching element Q0 is turned OFF before the reversing operation is started.

Therefore, in the discharge lamp ballast 20 of the present embodiment shown in FIG. 3, in the inverter drive signal generator circuit 24, the output of the low-frequency oscillator circuit LF-OSC indicating the output polarity of the inverter circuit 22 is input into the D-input of the flip-flop circuit FF1, and the PWM signal from the PWM signal generator circuit 16 is input into the clock input. Accordingly, the signal synchronized with the ON timing of the PWM signal is output the Q-output of the flip-flop circuit FF1. By inputting this signal into the PWM ON-signal control circuit 17, the operation switching timing at which an increase of the output voltage of the DC-DC converter circuit 21 is started can be matched with the measuring starting point of the delay time for deciding a starting point of the reversing operation of the inverter circuit 22.

The PWM signal from the PWM signal generator circuit 16 is delayed by the delay circuit 242 by the delay time Ty and then is input into the clock input of the flip-flop circuit FF, and the Q-output of the flip-flop circuit FF1 is input into the D-input of the flip-flop circuit FF. Thus, the signal from the Q-output of the flip-flop circuit FF is sent to the driver circuit 121 of the inverter circuit 22 via the dead time adding circuit 141. As a result, the switching elements Q1 to Q4 are caused to start the reversing operation with a delay given by the delay time Ty from the ON timing of the switching element Q0.

In this case, the delay time Ty may be fixed to the predetermined conditions, but the delay time Ty may be adjusted to meet the conditions for the ON time when the ON time of the PWM signal is varied largely.

Accordingly, the number of times of the OFF operation of the switching element Q0 in the DC-DC converter circuit 21 in the period in which the lamp current Ila reaches zero from the reversal start can be increased. Also, the output voltage Vo of the inverter circuit 22 at a time point the lamp current Ila is zero can be made higher, and the reignition voltage can be sufficiently ensured.

The circuit configuration of the discharge lamp ballast 20 according to the present embodiment is not limited to the above-described configuration, and other circuit configurations may be employed so long as such circuits can perform the similar operation. Further, a circuit configuration capable of accomplishing the similar operation on software by using a microcomputer, or the like may be employed. For example, a circuit configuration in which a synchronizing operation of the reversing timing in the inverter circuit 22 is shifted to an interrupting process caused by the PWM signal thereby starting the reversing process may be employed.

As described above, according to the discharge lamp ballast 20 according to Embodiment 2 of the present invention, the ON signal of the switching element Q0 is detected at the time point Ts immediately after the time point at which the operating conditions are switched into the PWM operating conditions which increases the output voltage of the DC-DC converter circuit 21, the reversing operation of the inverter circuit 22 is started at a time point after the predetermined time has elapsed from the ON timing, and the reversing operation is started from the dead time Td in which all switching elements Q1 to Q4 are turned OFF. Accordingly, the number of times of the OFF operation of the switching element Q0 in the DC-DC converter circuit 21 in the period in which the lamp current Ila reaches zero from the reversal start can be increased. Also, the output voltage Vo of the inverter circuit 22 at a time point the lamp current Ila is zero can be made higher, and the reignition voltage can be sufficiently ensured.

In other words, according to the present embodiment, the number of times of the OFF operation of the switching element in the dead time period and the period in which the lamp current reaches zero from the reversal start of the inverter circuit can be increased. Therefore, the output voltage of the DC-DC converter circuit in this period can be increased, and the necessary reignition voltage can be ensured sufficiently.

Embodiment 3

Figure 6:
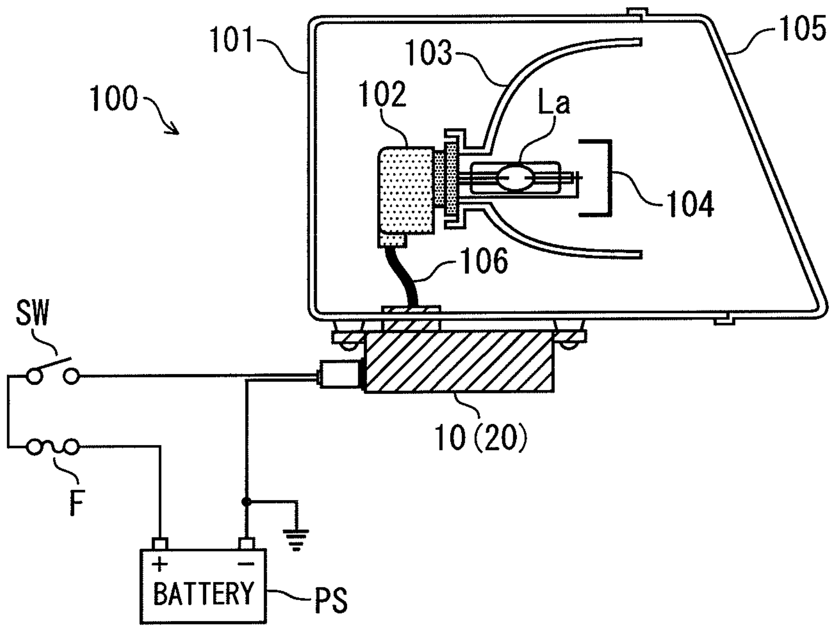
FIG. 6 is a sectional view showing a schematic configuration of a lighting unit according to Embodiment 3 of the present invention.
Figure 7:
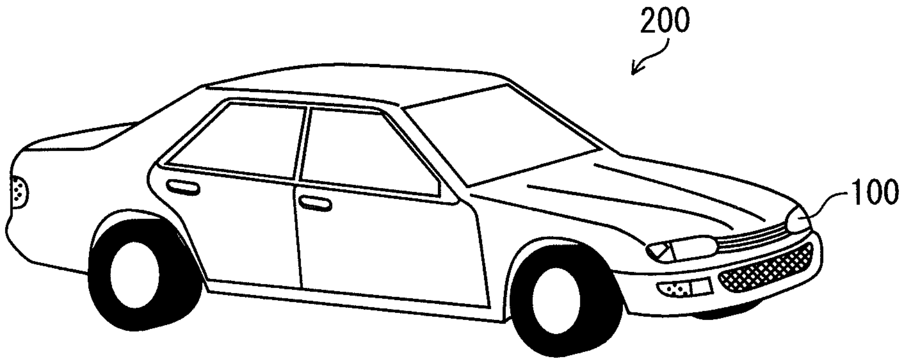
FIG. 7 is an external perspective view of a vehicle equipped with the lighting unit according to Embodiment 3 of the present invention.
Figure 8:
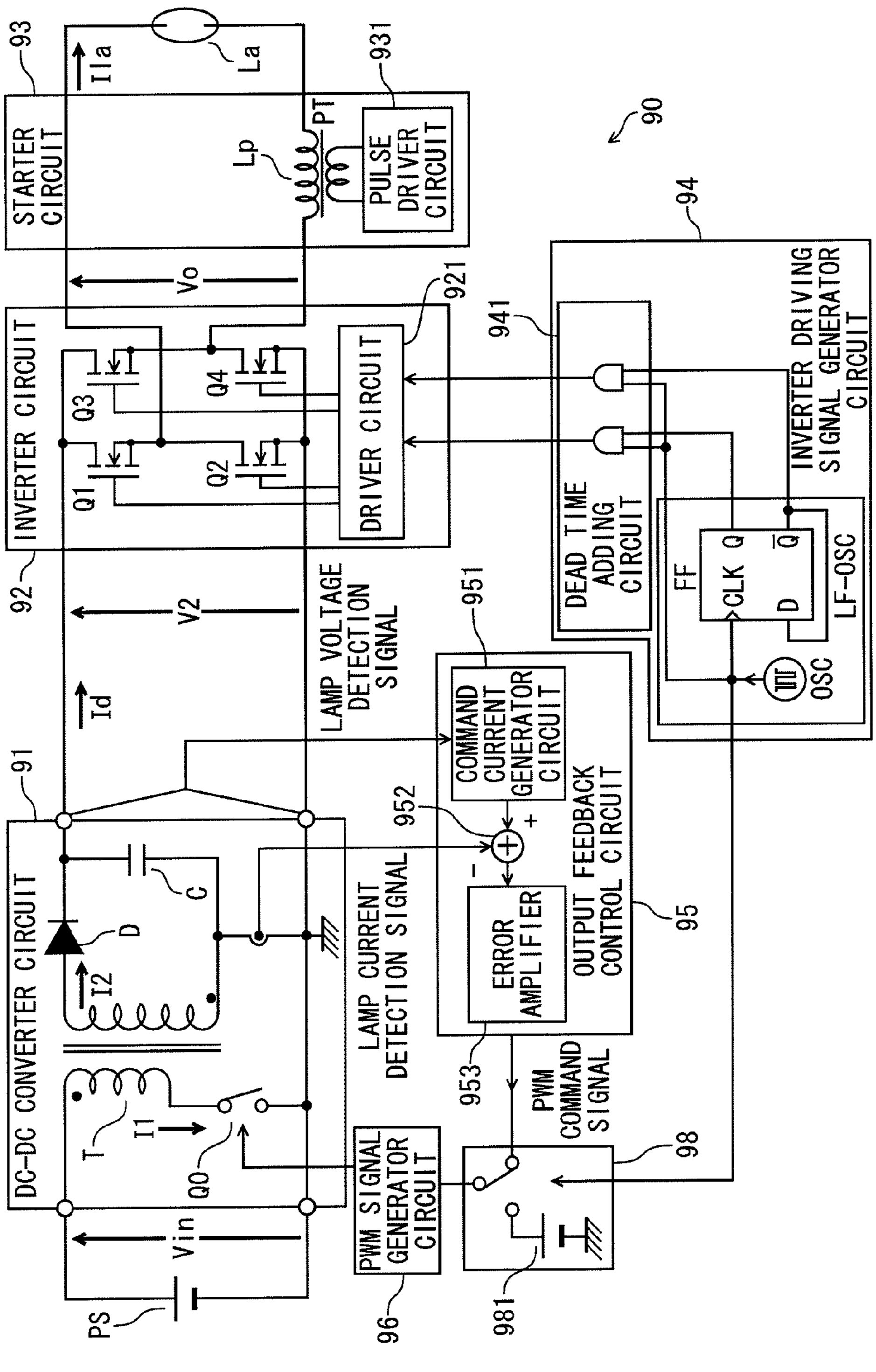
FIG. 8 PRIOR ART
FIG. 8 is a schematic diagram of a related-art discharge lamp ballast.
Figure 9:
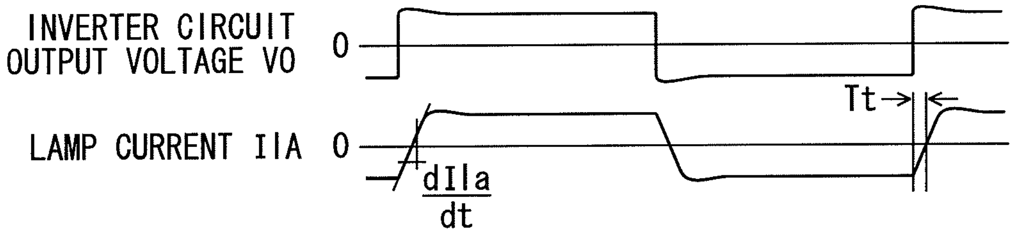
FIG. 9 is an operating waveform diagram explaining an operation of the related-art discharge lamp ballast.
Figure 10:
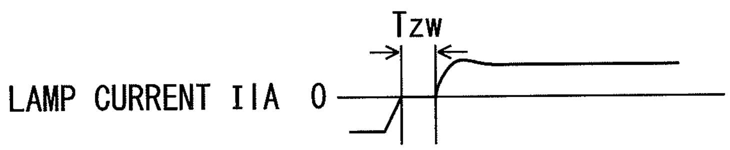
FIG. 10 is an operating waveform diagram explaining an operation of the related-art discharge lamp ballast.
Figure 11:
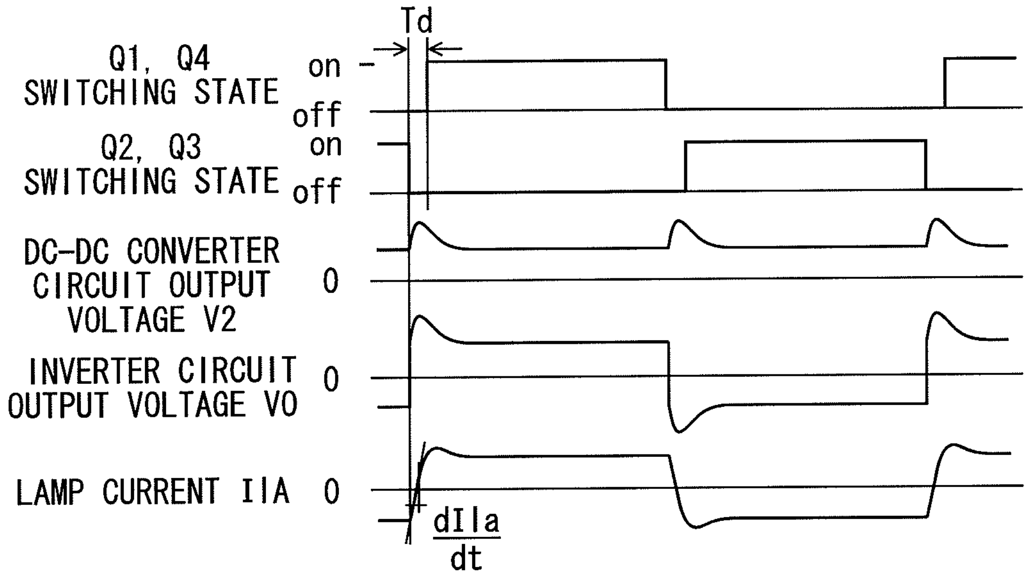
FIG. 11 is an operating waveform diagram explaining an operation of the related-art discharge lamp ballast.

FIG. 6 is a schematic diagram of a lighting unit according to Embodiment 3 of the present invention, and FIG. 7 is an external perspective view of a vehicle equipped with the lighting unit according to Embodiment 3 of the present invention.

In FIG. 6, a lighting unit 100 is configured such that the discharge lamp La fitted to a socket 102, a reflector plate 103 configured to reflect a light of the discharge lamp La ahead, and a light shielding plate 104 configured to prevent the glare are housed inside a box-shaped casing 101 with the front surface opened. A light emitted from the discharge lamp La is irradiated to the outside via a translucent cover 105 fitted to an opening portion on the front surface of the casing 101.

Also, the discharge lamp ballast 10 or 20 according to Embodiment 1 or Embodiment 2 is housed in the case and is fitted to the lower outside of the casing 101, and is connected to the socket 102 via a cable 106. The DC power supply PS including the battery is connected to this discharge lamp ballast 10 (20) via a switch SW and a fuse F.

The lighting unit 100 configured in this manner is provided as the headlight on each of left and right sides of the front portion of the car body of a vehicle 200 shown in FIG. 7, for example.

According to Embodiment 3 of the present invention, the lighting unit that can suppress the noise, eliminate the flickering or the going-out of an illumination light, and have the prolonged life, and the vehicle equipped with the lighting unit can be provided.

Here, the present invention is not limited to the above-described embodiments, and is scheduled for those skilled in the art to make changes or applications based on the description of the specification and the well-known technology, and such variations and applications are contained within a scope for which a protection is sought. Also, constituent elements in the above embodiments may be combined arbitrarily without departing from the scope of the invention.

This application is based upon Japanese Patent Application (Patent Application No. 2009-077733) filed on Mar. 26, 2009; the contents of which are incorporated herein by reference.

DESCRIPTION OF REFERENCE SIGNS

10, 20 discharge lamp ballast
11, 21 DC-DC converter circuit
12, 22 inverter circuit
13 starter circuit
14, 24 inverter drive signal generator circuit
15 output feedback control circuit
16 PWM signal generator circuit
17 PWM ON-signal control circuit
100 lighting unit
200 vehicle
La discharge lamp
PS DC power supply
Q0 to Q4 switching element

The invention claimed is:

1. A discharge lamp ballast, comprising:

a DC power supply;

a DC-DC converter that converts a voltage of the DC power supply by operation of a switching element based on a PWM signal and outputs DC power; and an inverter that inverts the DC power into AC power having a lower frequency than a switching frequency of the DC-DC converter, thereby lighting a discharge lamp by the AC power of the inverter, a PWM ON-width controller that increases the ON time of the switching element starting from an edge of an AC oscillator signal received from an AC oscillator, a PWM signal generator that generates the PWM signal, and controls the switching element in the DC-DC converter to increase an ON-width of the PWM signal immediately before a polarity of the AC oscillator is reversed, such that the ON-width of the PWM signal is increased from a start of a polarity reversal, to increase the DC power in a period, and an inverter driving signal generator that causes the polarity of the AC power of the inverter to be reversed in synchronism with an operation of the switching element immediately after the PWM ON-width controller increases the ON-width of the PWM signal.

2. The discharge lamp ballast according to claim 1, the inverter is in a dead time when switching elements of the inverter are turned OFF, in synchronism with the operation of the switching element of the DC-DC converter immediately after the control by the PWM ON-width controller increases the ON-width of the PWM signal.

3. The discharge lamp ballast according to claim 2, the inverter is in the dead time immediately before the DC power, increased by the PWM ON-width controller to increase the ON-width, is output from the DC-DC converter circuit.

4. The discharge lamp ballast according to claim 1, the inverter is in a dead time with a time delay from the operation of the switching element immediately after the PWM ON-width controller increases the ON-width of the PWM signal.

5. The discharge lamp ballast according to claim 1, further comprising:

an inductor connected between an output terminal of the inverter and the discharge lamp; and a capacitor connected to an input terminal, an output terminal, or both terminals of the inverter, the period in which the DC power is increased, is ½ or less of a resonance period of a resonance circuit comprising the inductance component and the capacitor.

6. The discharge lamp ballast according to claim 5, the inductor has a value such that a time until an electric current of the discharge lamp reaches zero, from a start of an AC power reversal, is larger than the switching period of the switching element in the period during which the DC power is increased.

7. The discharge lamp ballast according to claim 1, the operation of the switching element in the period in which the DC power is increased is executed by an open-loop control applied to the DC-DC converter.

8. The discharge lamp ballast according to claim 1, wherein at least one of the ON time and a period of the PWM signal are adjusted by the PWM signal generator in accordance with a detected level of an input voltage, an output voltage, or the input and output voltages of the DC-DC converter.

9. A light, comprising the discharge lamp ballast according to claim 1.

10. A vehicle, comprising the light according to claim 9.

* * * * *